Nov. 8, 1927.
C. E. DATH
1,648,297
DRAFT GEAR
Filed Feb. 28, 1925
2 Sheets-Sheet 1
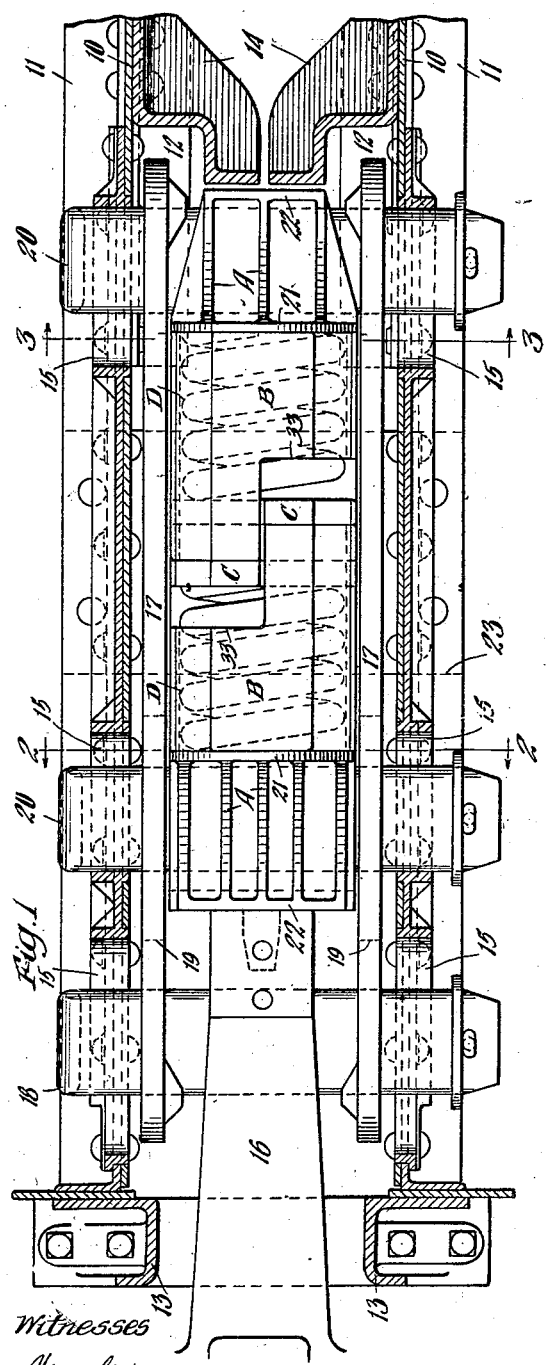
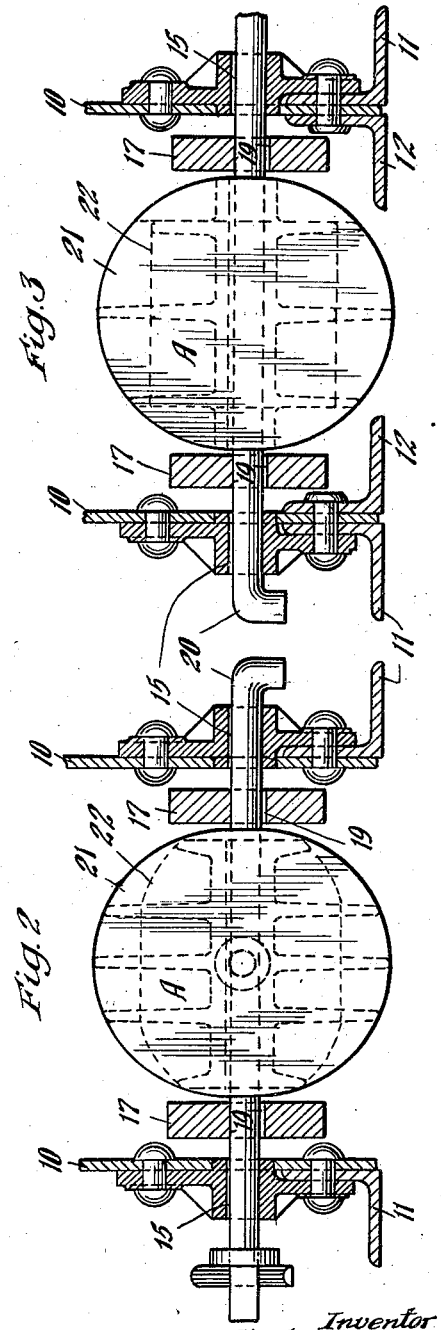
Witnesses
Wm. Geiger
Inventor
Charles E. Dath
By George I. Haight
His Atty.

Nov. 8, 1927.  
C. E. DATH  
1,648,297  
DRAFT GEAR  
Filed Feb. 28, 1925  
2 Sheets-Sheet 2
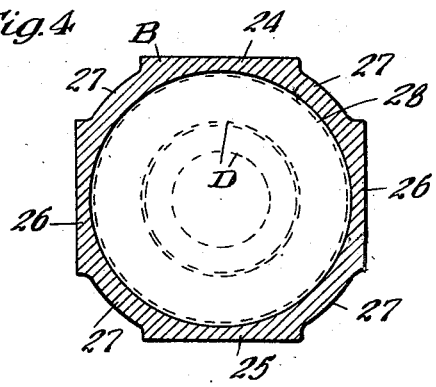
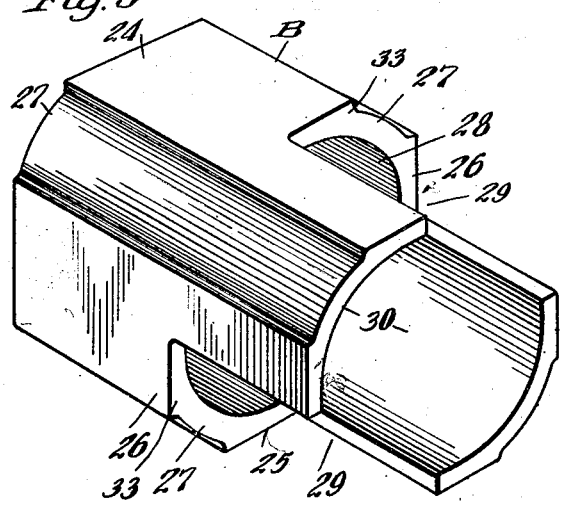
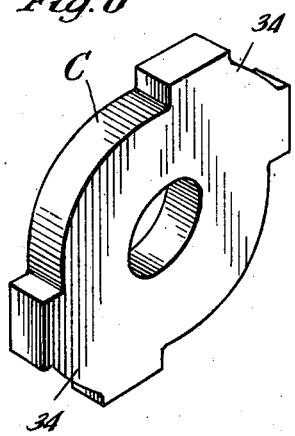

Patented Nov. 8, 1927.

1,648,297

UNITED STATES PATENT OFFICE.

CHARLES E. DATH, OF CHICAGO, ILLINOIS, ASSIGNOR TO W. H. MINER, INC., OF CHICAGO, ILLINOIS, A CORPORATION OF DELAWARE.

DRAFT GEAR.

Application filed February 28, 1925. Serial No. 12,206.

This invention relates to draft gears.

In the operation of railroad cars, it is now the general practice to employ draft gears having front and rear main followers between which the shock absorbing mechanism is interposed, the latter being either of the spring or of the friction type. Yoke means of various types are employed in connection with the main followers to effect relative movement of the latter. One type most commonly employed comprises a yoke having a single pocket in which the front and rear main followers and the shock absorbing mechanism are disposed, the followers in this instance being of rectangular plate-like form and co-operating with front and rear stop lugs on the draft sills of the car. Another type found on many cars and used by certain railroads comprises a two-part yoke consisting of side members or links having keys associated therewith, which extend through the followers and slide in slots in the draft sills. The latter type involves the use of specially formed followers. Both of these arrangements are particularly adapted for friction shock absorbing mechanisms. Certain railroads having cars provided with an underframe construction requiring the use of either yokes having a single pocket or yokes of the two-part link type hereinbefore referred to, prefer the use of spring shock absorbing mechanisms, and it is one object of my invention, therefore, to provide a spring shock absorbing mechanism of such capacity which will meet present day conditions, so designed that it is adapted for use with any of the special types of front and rear followers employed in connection with the various types of yokes now used and especially yokes of the single pocket and two-part link types and particularly designed for use in connection with the specially formed followers employed with the latter type of yoke.

A further object of my invention is to provide a tandem draft gear including a two-part link type yoke, front, rear and intermediate followers, front and rear springs and relatively movable spring casings bearing at their outer ends on the front and rear followers respectively, wherein the outer ends of the casings preferably substantially correspond in outline to the end faces of the followers engaged thereby to assure true contact between the casings and the front and rear followers.

Still another object of the invention is to provide a spring shock absorbing mechanism of relatively high capacity, which is of exceptionally rugged and substantial construction, comprising the minimum number of parts and which may be economically manufactured.

Other objects and advantages of the invention will more fully and clearly appear from the description and claims hereinafter following.

In the drawings forming a part of this specification, Figure 1 is a longitudinal, horizontal, sectional view of a railway draft rigging showing my improvements in connection therewith. Figures 2 and 3 are vertical, transverse, sectional views corresponding respectively to the lines 2—2 and 3—3 of Figure 1, the views being partly broken away at the top. Figure 4 is a transverse, vertical, sectional view through a spring casing. And Figures 5 and 6 are detailed, perspective views, respectively, of a spring casing and an intermediate spring follower.

In said drawings, 10—10 indicate center or draft sills of a well known form, having the usual flanges at the top and bottom thereof, the flanges at the bottom of the sills only being shown in Figures 2 and 3. In this instance, the flanges are provided by angle bars 11—11 and 12—12 having the vertical legs thereof riveted to the respective sills. The angle bars 11 are disposed on the outer side of the sills and extend substantially the entire length thereof and the angle bars 12 are disposed on the inner sides of the sills and have their outer ends spaced an appreciable distance inwardly of the outer ends of the corresponding sills as shown in Figure 1. To the outer ends of the sills is secured a transversely disposed striking casting 13, having the usual carry iron for the drawbar secured thereto. The shock absorbing mechanism proper is arranged between the sills 10 as clearly shown in Figure 1, and disposed rearwardly of the shock absorbing mechanism is a two-part stop casting of desirable form, consisting of the members 14—14 fixed to the inner faces of the sills 10 in any suitable manner, for example, by rivets. Each of the draft sills 10 is provided with three elongated openings arranged longitudinally thereof and each sill has a reinforcing cheek plate secured to the outer face thereof, the cheek plates being each provided with three key-receiving guide openings 15, coincident with the openings of the sill, each opening being provided with the usual reinforcing flanges on the inner and outer sides of the cheek plate, the flanges on the inner side being seated in the respective openings of the corresponding sill 10. The inner end of the drawbar is indicated by 16. A two-part yoke comprising the side members or links 17—17 is operatively connected to the drawbar by a transverse coupler key 18 extending through the drawbar and movable in unison therewith. The members 17 are provided with elongated slots 19, accommodating the key for limited sliding movement and the opposite ends of the key work in the slots 15 at the outer ends of the side sills.

Front and rear main followers A—A are operatively disposed between the draft sills, each follower having a supporting key 20 extending transversely therethrough and movable in unison therewith, the opposite ends of each key working in corresponding slots 15 of the two sills, movement of the key lengthwise of the sills being limited by the walls at the opposite ends of said slots. The keys 20 thus support the followers A for limited relative movement.

The front and rear followers A are preferably in the form of castings and are of like construction, except as herein pointed out. Each follower comprises relatively heavy, vertically disposed, plate-like sections 21 and 22 at the inner and outer ends thereof and a horizontally disposed heavy web connecting the plate-like sections, the plate sections and the web being reinforced by a series of top and bottom ribs extending from the inner to the outer plate sections. The inner plate section 21 of each follower is of curved outline as shown, being preferably of oval form. The plate section 22 of the front follower is also of oval form, but of less height than the corresponding plate section 21 and has its longer axis disposed horizontally. The plate section 22 of the front follower serves as an abutment face for the inner end of the drawbar during the buffing action of the gear. The plate section 22 of the rear follower is preferably of rectangular shape to correspond with the abutment face of the forward end of the stop casting 14—14.

The shock absorbing mechanism proper, which is interposed between the front and rear followers, comprises broadly front and rear spring casings B—B; intermediate followers C—C; and front and rear spring elements D—D. The spring casings B and the parts associated therewith are operatively supported by a relatively wide, detachable saddle plate 23 fixed to the draft sills.

The two casings B are preferably of substantially identical construction. Each of said casings, as shown, comprises horizontally disposed top and bottom walls 24 and 25, and vertical side walls 26—26. The four corners of each casing are cut away as shown, providing curved corner walls 27—27 and longitudinally disposed reinforcing ribs at the junctions between the corner walls and the corresponding top, bottom and side walls. The outer ends of the two casings A bear respectively on the front and rear followers. Each casing is open at the outer end, and has a longitudinal cylindrical opening or pocket 28 adapted to accommodate one of the main springs D. At its inner end, that is, the end remote from the main follower on which it bears, each casing is cut away or recessed at diagonally opposite top and bottom corners as indicated at 29, providing a pair of longitudinally extending arms 30—30 at the inner end of each casing. As shown, the cut away portions include slightly more than half of the corresponding top and side walls of the casing. The two arms 30 have concave inner surfaces which are continuations of the inner surface of the corresponding pocket 28. Each arm also has a convex outer surface which is a continuation of the outer surfaces of the corresponding corner wall 27 and two flat outer surfaces which are continuations of the outer surfaces of the corresponding walls of the casing, the flat surfaces of each arm being disposed at right angles to each other. At the inner end of each opening 29 is provided a flat, transversely extending limiting stop shoulder 33, for the purpose hereinafter described. It will be evident that the arms 30 are of exceptional strength and great rigidity due to the horizontal and vertical portions thereof being angularly disposed with reference to each other, thus offering unusual resistance to transverse bending strains or distortion. In other words, each of the arms is in effect a longitudinal section of a tubular member, that is, each arm is broadly of channel cross-section. As clearly shown in the drawings, the casings are of substantially uniform size throughout their length, being preferably of the cross-section most clearly shown in Figure 4, each casing being of such a size that the outer end thereof corresponds substantially in outline with the plate-like inner end of the corresponding main follower. As will be evident, upon reference to Figure 1, the members of the two-part yoke embrace the casings, preventing lateral displacement thereof and the flat outer faces of the side walls 26 of the casings co-operate with the flat inner faces of the members 17 to prevent the casings from turning.

The two intermediate followers C—C are of like construction. Each of the intermediate followers as shown in Figure 6, is in the form of a relatively heavy, substantially disk-like plate having extensions 34—34 at diametrically opposite sides thereof, corresponding in outline to the end faces of the corresponding arms 30. Between the extensions 34, each disk is of circular outline, the diameter of the circular portion of the disk being slightly less than the diameter of the cylindrical openings 28 of the spring casings. Each spring follower is slidably disposed between the arms 30 of the corresponding follower casing, the extensions 34 being slidably disposed in the openings 29 with the circular edges fitting the concave inner surfaces of the two arms 30.

The two spring resistance elements D—D, each of which preferably consists of a heavy outer coil and a relatively lighter inner coil, are disposed within the front and rear follower casings respectively.

In assembling the shock absorbing device, one of the springs is inserted in the pocket of each casing A and the corresponding intermediate follower is assembled with the casing to slide between the arms 30 with the extensions 34 working in the corresponding openings 29. The two casings A with the springs D and followers C therein, are then assembled with each other so that the two arms 30 of the front casing A will be telescoped and slide with respect to the two arms 30 of the rear casing as best illustrated at Figure 1. It will be evident that when the parts are thus assembled, the rear ends of the arms of the front casing will bear on the rear intermediate follower and the front ends of the arms of the rear casing bear on the front intermediate follower. When thus assembled, the springs co-acting with the casings will effectively prevent separation of the latter in any direction in a plane normal to the longitudinal axis of the casings and the casings are permitted to move relatively longitudinally of the mechanism to further telescope.

In the operation of my improved draft gear, assuming a compression stroke of the mechanism under a buffing action, the rear casing A is held stationary by engagement of the rear follower which in turn is held against rearward movement through the medium of the rear key 20 abutting the rear end walls of the corresponding guide slots of the side sills. The front intermediate follower C also remains stationary being held by the arms 30 of the rear follower casing. As the front follower A is moved rearwardly, the front casing B is moved in unison therewith and carries with it the rear intermediate follower C, thus effecting simultaneous compression of the front and rear springs in tandem. In actual practice, the length of the recesses and arms of the telescoping portions of the two casings A will be such that the intermediate followers will simultaneously engage the limiting stop shoulders 33 of the front and rear casings respectively, at the end of the compression stroke, so as to prevent the springs from being driven solid. The casings also provide an exceptionally strong column for transmitting the blow to the side sills when the mechanism is fully compressed. The parts are preferably so proportioned that the relative movement of the casings and movement of the key 20 associated with the front follower will be simultaneously arrested, the key being limited in its inward movement by engagement with the inner end walls of the corresponding guide slots 15. It will be evident that should the rear stop key become bent in service, movement of the rear follower will be positively limited by the stop casting 14 which acts as a safety device, a slight space being normally left between the stop casting and the follower as shown in Figure 1. During draft, the action will be substantially the reverse of that just described, the front follower remaining stationary and rear follower being pulled forwardly by the two-part yoke.

From the preceding description, taken in connection with the drawings, it will be evident that although in the specific embodiment of the invention illustrated, the spring casings are so shaped and designed as to co-operate with oval disk-like followers so as to have proper bearing thereon, they will function equally well in connection with other types of followers having flat inner faces, including rectangular plate-like followers extending from one side sill to the other.

While I have herein shown and described what I now consider the preferred manner of carrying out my invention, the same is merely illustrative and I contemplate all changes and modifications that come within the scope of the claims appended hereto.

I claim:

1. In a railway draft rigging, the combination with front and rear follower acting elements having inner end faces of curved outline; of yoke acting means co-operating with said followers; two alined relatively longitudinally movable casings each having a spring receiving pocket therein, the said casings having the outer ends thereof bearing on said front and rear follower acting elements, said outer ends being of a size and outline to substantially register with the inner end faces of the follower acting elements respectively; spring resistance elements disposed within said casings; and intermediate followers co-operating with said spring elements.

2. In a railway draft rigging, the combination with front and rear follower acting elements having inner end faces of curved outline; of two, relatively longitudinally movable casings each having a spring pocket therein, said casings having their outer ends bearing on the front and rear follower elements respectively, said outer ends being of curved outline to correspond to the outline of said follower elements; spring elements within the casings; and intermediate followers co-operating with said spring elements.

3. In a draft rigging, the combination with front and rear followers having oval inner end faces; of a two-part link yoke co-operating with said followers; two, relatively longitudinally movable casings, said casings having outer ends substantially corresponding in contour to and bearing on the front and rear followers; springs disposed within said casings; and intermediate followers co-operating with said springs.

4. In a shock absorbing mechanism, the combination with front and rear followers; of two alined, relatively longitudinally movable casings having spring receiving pockets therein, said casings being of a cross-section substantially corresponding in contour to the faces of said followers and open at their outer ends; a spring disposed within the pocket of each casing and bearing on the corresponding follower; and intermediate followers co-operating with said springs and adapted to be moved relatively to each other upon relative movement of said casings.

5. In a shock absorbing mechanism, the combination with front and rear, relatively movable follower casings, each of said casings having arms at the inner ends of channel form, said arms having sections thereof disposed at right angles to each other; intermediate followers respectively co-operating with the arms of the front and rear casings; and a spring resistance element within each casing, said elements bearing respectively on the intermediate followers.

6. As an article of manufacture, a spring casing comprising a shell portion of substantially tubular cross-section having pressure transmitting arms, each arm having top, bottom and side walls and side portions which are angularly disposed with reference to each other, said angularly disposed portions forming continuations of two adjacent walls of the casing.

7. In a railway draft rigging, the combination with draft sills; of front and rear main followers, each horizontally slotted; keys extending horizontally through said slots of the followers, said draft sills having corresponding, horizontally elongated slots to accommodate the ends of said keys; link connections adjacent the inner face of each draft sill and co-operatively associated with said keys and adapted to be operatively connected with a draw-bar; and a tandem shock absorbing mechanism interposed between said followers and between said links, said mechanism including front and rear casings adapted for limited relative movement, intermediate followers associated with said casings, and shock absorbing units interposed between each intermediate follower and the nearest adjacent main follower, said casings having flat side walls paralleling said links and restrained by said links, laterally, to maintain said shock absorbing mechanism in alinement with said main followers.

8. In a draft gear for railway cars, counterpart casings having slidable interfitting telescoping engagement, a follower movable within each casing and actuated in one direction by the opposite casing, said followers each having projecting portions the surface contour of the projecting portions of said followers and the cross sectional contour of said casings being octagonal in form.

9. In a draft gear for railway cars, counterpart casings having slidable interfitting engagement and enclosing springs and followers, the casings having external faces at obtuse angles to one another, and means for longitudinally reinforcing said faces.

10. In a draft gear for railway cars, counterpart casings having slidable interfitting engagement and enclosing springs and followers, the casing having external faces at obtuse angles to one another.

11. In a draft gear, springs arranged in tandem, followers at the outer ends of the springs, followers at the adjacent ends of the springs, and counterpart casings surrounding and enclosing the springs, said casings having their adjacent ends slotted and slidably interfitting, with portions of the second named followers fitting within the slots, the casings having their outer peripheries of polylateral formation with obtuse angles, and the edges of the slots being located at the centers of alternate ones of said faces.

In witness that I claim the foregoing I have hereunto subscribed my name this 25th day of February, 1925.

CHARLES E. DATH.